United States Patent
Rhede et al.

(10) Patent No.: US 10,936,161 B2
(45) Date of Patent: Mar. 2, 2021

(54) METHOD FOR ADAPTING THE PRESENTATION AND USE OF A GRAPHICAL USER INTERFACE

(71) Applicant: VOLKSWAGEN AKTIENGESELLSCHAFT, Wolfsburg (DE)

(72) Inventors: Johannes Rhede, Berlin (DE); Carsten Temming, Braunschweig (DE); Johannes Tümler, Wellen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/340,103

(22) PCT Filed: Oct. 10, 2016

(86) PCT No.: PCT/EP2016/074239
§ 371 (c)(1),
(2) Date: Apr. 6, 2019

(87) PCT Pub. No.: WO2018/068821
PCT Pub. Date: Apr. 19, 2018

(65) Prior Publication Data
US 2020/0050325 A1 Feb. 13, 2020

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 3/04845* (2013.01);
(Continued)

(58) Field of Classification Search
CPC .............. G06F 3/0482; G06F 3/04817; G06F 3/04845; G06F 3/04883
See application file for complete search history.

(56) References Cited

U.S. PATENT DOCUMENTS 8,155,837 B2 * 4/2012 Aoki .................... B60Q 1/0082
701/41
9,086,731 B2 * 7/2015 Hisano .................... G06F 3/017
(Continued)

FOREIGN PATENT DOCUMENTS

DE 102008021186 A1 10/2009
DE 102009059868 A1 6/2011
(Continued)

OTHER PUBLICATIONS

Bederson et al.; Implementing a Zooming User Interface: Experience Building Pad++; Software Practice & Experience; Aug. 1, 1998; pp. 1101-1135; vol. 28, No. 10.
(Continued)

*Primary Examiner* — David E Choi
(74) *Attorney, Agent, or Firm* — Barnes & Thornburg LLP

(57) ABSTRACT

A method which presents icons corresponding to applications, wherein each icon functions as an identifier for an application and the individual applications in this display cannot be operated by the user; detects a user input for selecting some of the applications identified by the icons; presents enlarged icons for the selected applications, wherein no comprehensive user functionality of the selected applications is available but a user action is performed for at least one application; detects an additional user input for selecting one of the applications identified by the enlarged icons; and presents the content of the selected application, wherein a comprehensive user functionality of the application can be accessed.

19 Claims, 3 Drawing Sheets

(51) Int. Cl.
   *G06F 3/0481*  (2013.01)
   *G06F 3/0484*  (2013.01)
   *G06F 3/0488*  (2013.01)

(52) U.S. Cl.
   CPC .......... *G06F 3/04883* (2013.01); *G06F 2203/04114* (2019.05); *G06F 2203/04806* (2013.01); *G06F 2203/04808* (2013.01)

(56) References Cited

U.S. PATENT DOCUMENTS

| | | | | |
|---|---|---|---|---|
| 9,542,548 | B2* | 1/2017 | Conforti | G06F 21/36 |
| 2009/0119679 | A1* | 5/2009 | Dowlan | G06F 9/547 |
| | | | | 719/313 |
| 2012/0236040 | A1* | 9/2012 | Eom | G09G 3/007 |
| | | | | 345/681 |
| 2013/0047119 | A1 | 2/2013 | Lee | |
| 2013/0147849 | A1 | 6/2013 | Kwak et al. | |
| 2013/0290889 | A1* | 10/2013 | Bao | G06F 3/0486 |
| | | | | 715/770 |
| 2013/0298066 | A1* | 11/2013 | Kim | G06F 3/0233 |
| | | | | 715/773 |
| 2014/0052725 | A1* | 2/2014 | Lee | G06F 16/24 |
| | | | | 707/736 |
| 2014/0207862 | A1* | 7/2014 | Domke | H04L 65/403 |
| | | | | 709/204 |
| 2014/0207874 | A1* | 7/2014 | Soorianarayanan | H04L 65/403 |
| | | | | 709/206 |
| 2014/0207875 | A1* | 7/2014 | Messinger | H04W 4/38 |
| | | | | 709/206 |
| 2014/0208159 | A1* | 7/2014 | Soorianarayanan | G06Q 10/06 |
| | | | | 714/27 |
| 2014/0208163 | A1* | 7/2014 | Domke | G06F 11/0751 |
| | | | | 714/37 |
| 2015/0339285 | A1* | 11/2015 | Safaei | H04L 51/18 |
| | | | | 715/256 |
| 2015/0363083 | A1 | 12/2015 | Kögler et al. | |
| 2016/0011737 | A1* | 1/2016 | Kang | G06F 3/0488 |
| | | | | 715/808 |
| 2016/0274717 | A1* | 9/2016 | Wako | G06F 3/0488 |
| 2017/0048450 | A1* | 2/2017 | Lee | H04N 5/23229 |
| 2018/0208060 | A1* | 7/2018 | Kim | B60W 50/14 |
| 2018/0300351 | A1* | 10/2018 | Glover | H04L 67/34 |
| 2020/0050325 | A1* | 2/2020 | Rhede | G06F 3/0482 |
| 2020/0201534 | A1* | 6/2020 | Chen | G06F 3/04883 |

FOREIGN PATENT DOCUMENTS

| | | |
|---|---|---|
| DE | 102012200672 A1 | 4/2013 |
| DE | 102012020607 A1 | 4/2014 |
| DE | 102014209247 A1 | 12/2014 |
| DE | 102014211342 A1 | 12/2015 |
| EP | 1959337 A2 | 8/2008 |
| EP | 2955614 A1 | 12/2015 |
| KR | 20130052753 A | 5/2013 |
| KR | 20150143355 A | 12/2015 |

OTHER PUBLICATIONS

Wikipedia; Zooming user interface; Aug. 14, 2008; retrieved from the Internet.

Search Report for International Patent Application No. PCT/EP2016/074239; dated Jun. 28, 2017.

* cited by examiner

METHOD FOR ADAPTING THE PRESENTATION AND USE OF A GRAPHICAL USER INTERFACE

PRIORITY CLAIM

This patent application is a U.S. National Phase of International Patent Application No. PCT/EP2016/074239, filed 10 Oct. 2016, the disclosure of which is incorporated herein by reference in its entirety.

SUMMARY

Illustrative embodiments relate to a method for adapting the presentation and use of a graphical user interface, and to a graphical user interface, which is configured for implementing the method.

BRIEF DESCRIPTION OF THE DRAWINGS

Disclosed embodiments are described in more detail below with reference to the drawing, in which.

DETAILED DESCRIPTION

Figure 1:
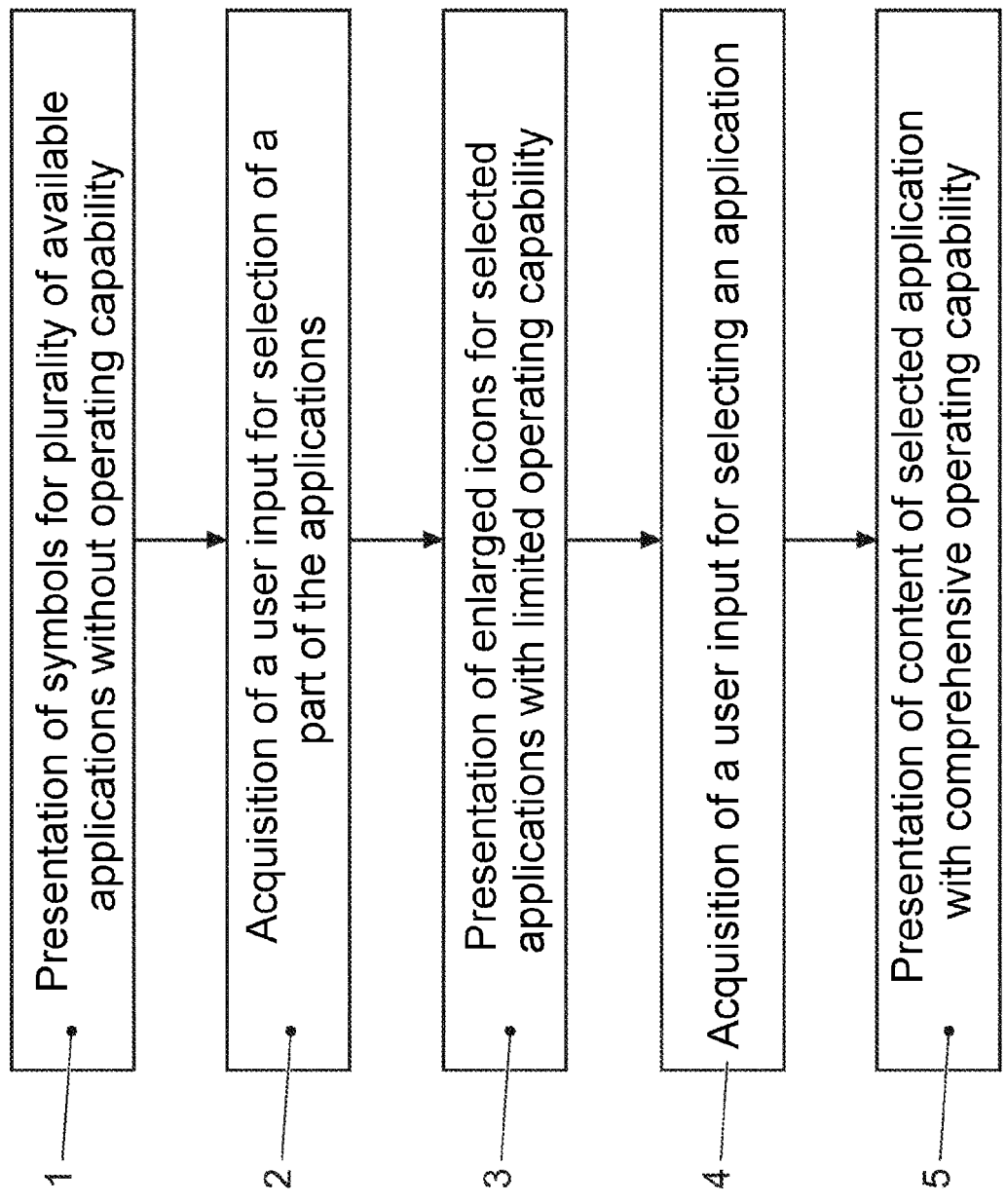
FIG. 1 shows a schematic flow chart for an exemplary embodiment of the disclosed method.

An interaction with machines and equipment requires the use of user interfaces (abbreviated to HMI standing for "Human Machine Interface"), wherein graphical user displays or user interfaces (abbreviated to GUI for "Graphical User Interface") have now become very widespread. Graphical user interfaces allow complex graphical elements to be presented on a display screen, selected and operated. An operation can be performed using a plurality of different input devices. For example, in the field of computer technology a computer mouse is often used as an input device, in mobile wireless devices such as so-called smartphones and tablet computers operation normally takes place by touching the touch-sensitive display interface, a so-called touch screen. Instead of the use of such input devices however, input techniques such as operation by voice input or gesture control can also be used.

To allow the interaction, control elements, such as, graphical symbols, so-called icons, are frequently displayed on GUIs. Other types of control elements that can be used are buttons, symbol or tool bars (toolbars), sliders, selection lists or dialog boxes. One of these control elements can be dialed up or selected by the user, and is then in the focus for the next input. This can be made visible to the user, by the dialed-up or selected control element being graphically highlighted, which is beneficial if more than one dialable or selectable control elements are displayed. Larger icons with a higher level of detail are frequently also referred to as tiles, wherein these are usually rectangular in shape and on a working surface or a so-called home screen, a plurality of tiles can be arranged on a tile surface. Icons and tiles are usually associated with computer application programs, or applications ("apps" for short), which can be launched and operated by selecting an icon or a tile.

Furthermore, a GUI can be designed to be scalable so that individual elements or even the entire interface can be displayed in different degrees of scaling. In the case of a semantic scaling, individual elements are presented in different levels of detail depending on the degree of scaling. This has the benefit of both giving a good overall view and, when viewed more closely, an element is presented in greater detail, additional information being displayed. Thus DE 10 2014 211 342 A1 discloses a user interface with a tile-based menu on a display unit of a user interface, in which a semantic scaling of a tile is carried out in such a way that it is first displayed with a first plurality of buttons and then, triggered by a user command, shown enlarged with a second plurality of buttons.

Disclosed embodiments provide interaction with a graphical user interface in such a way as to offer the user a better user experience compared to the prior art.

Disclosed embodiments provide a method and a graphical user interface.

The disclosed method for adapting the presentation and use of a graphical user interface comprises the following operations. Firstly, in a first operation a plurality of icons corresponding to a plurality of applications is presented, wherein each icon functions as an identifier for an application and the individual applications in this presentation cannot be operated by the user. In a second operation a user input is acquired for selecting some of the applications identified by the icons. Thereupon in a third operation, enlarged icons for the selected applications are presented, wherein no comprehensive operating functionality of the selected applications is available, but an operator action can be performed for at least one application. In a fourth operation an additional user input is acquired for selecting one of the applications identified by the enlarged icons. Finally, in a fifth operation, the content of the selected application is presented, wherein a comprehensive control functionality of the application can be accessed.

The disclosed interaction with the graphical user interface reduces mistaken operations and at the same time enables a convenient and intuitive operation. Thus in many application areas, the number of applications that can be operated is growing continuously, so that if these applications are presented in their most complete form using symbols such as icons or tiles, the presentation of the individual icons on a screen is necessarily only very small. This can prevent the user from quickly and securely selecting a specific application and operating it. Therefore, an overview presentation is first provided, in which no function of a specific application can be operated directly, to prevent mistaken operations. If a part of the applications identified by the icons is now selected by a user input, then an enlarged presentation of the icons is performed, wherein an operation of a main function or a small number of main functions is now possible for at least one application. The most important functions can therefore be operated by the user without the need for any further selection and enlargement. If, however, the full functionality of the application is then to be accessed, this can be selected by a further user input, so that an again enlarged, now full-screen presentation of this application is made with comprehensive information and a plurality of control elements.

According to at least one disclosed embodiment, the user input for selecting part of the applications identified by the icons and the additional user input for selecting one of the applications identified by the enlarged icons are the same.

This has the benefit that the interaction with the graphical user interface may be intuitive for the user. This increases the user's acceptance for this menu interaction. In addition, this requires less attention from the user to operate, which is a benefit, for example, when the system is used in a transportation vehicle, since the distraction is reduced during operation by the driver and thus traffic safety is increased.

According to another disclosed embodiment, a control gesture of the user is acquired as user input for the selection. The control gesture can be carried out by the user's hand or individual fingers.

In this case it is beneficial if a cancellation of the selection is triggered by an opposite control gesture. This makes the operation more intuitive and therefore easier for the user.

The presentation and operation of the graphical user interface can be carried out by a touch-sensitive display screen of a display, since then no additional resources are required for acquiring the user input.

In this case, moving apart two fingers of the user on the touch-sensitive display surface is acquired as a control gesture for the selection and correspondingly, moving together two fingers of the user on the touch-sensitive display surface is acquired as a user gesture for canceling the selection.

In accordance with this disclosed embodiment, wherein when presenting the icons and/or enlarged icons of only some of the applications the presentation can be moved by a user input, such that icons and/or enlarged icons from another part of the applications are presented.

In this case it is beneficial if snap-in positions are provided for the presentation of the icons and/or enlarged icons, so that in the event of a displacement the icons and/or enlarged icons are aligned and presented in full at these snap-in positions.

According to at least one disclosed embodiment, the disclosed method is implemented by a graphical user interface with a display unit and an input unit, which is configured for adapting the presentation and use.

Finally, the disclosure also comprises a transportation vehicle, which is configured to carry out the disclosed method or has a disclosed graphical user interface.

For a better understanding of the principles of the present disclosure, exemplary embodiments are described in more detail below by reference to the figures. It goes without saying that the disclosure is not limited to these embodiments and that the described features can also be combined or modified without departing from the scope of protection of the disclosure.

FIG. 1 schematically shows an exemplary embodiment for the disclosed method for adapting the presentation and use of a graphical user interface.

In accordance with method operation at 1, a plurality of graphical symbols, such as icons, is firstly presented on the screen of a display device. The individual icons are assigned to an application in each case. Depending on the number of the applications present and the size of the screen, icons can be displayed for all applications or else only for a part of the applications. It is equally possible to also display other applications in addition to the already existing applications, which are available, for example, in a digital distribution platform for application software, a so-called App Store, and can be downloaded from this, using icons. To achieve this it can be beneficial to design the icons for, on the one hand, already existing applications and, on the other hand, applications that are available in an App Store to be different, so that it is readily apparent to the user whether the application can be accessed directly or not. A direct operation of the individual applications in this presentation is not possible. If necessary, however, it can be provided that in this presentation it is possible to launch or start an application.

In method operation at 2 a first input by a user is then acquired, with which part of the originally present or available applications identified by the icons is selected.

In accordance with method operation at 3 this is followed by a display of enlarged icons for the selected applications. In this intermediate stage icons continue to be displayed, for example, as tiles, for multiple applications, wherein the icons function not only as an identifier of the respective application but also reflect the most important information and the current status of the application. Here, too, no comprehensive control functionality of the selected applications is available, but a direct operator action of one or more main functions can be performed for at least one application. For example, in the case of a telephony application it may be possible to accept a call or end a call.

To display the full content of an application and to make the full functionality of the application available, in the subsequent method operation at 4 a further user input is acquired, with which the user selects one of the applications identified by the enlarged icons.

The selected application is then opened and the contents of the application displayed in method operation at 5. The full functionality of the application can then be accessed.

In the above-described exemplary embodiment of the disclosed method, between the overview display with minimal level of detail of the various applications and the display with the maximum level of detail, a single intermediate display is implemented for a selected application. It is also conceivable, however, that a plurality of intermediate displays with different numbers and sizes of the icons and varying degrees of detail can be selected and displayed by the user.

Also, according to the disclosure a change in the degree of detail can be made in the opposite direction, i.e., starting from a complete display for a single application with full functionality of the application, via one or more intermediate stages up to an overview display of the different applications without a direct facility to control the individual applications.

Figures 2A, 2B, 2C:
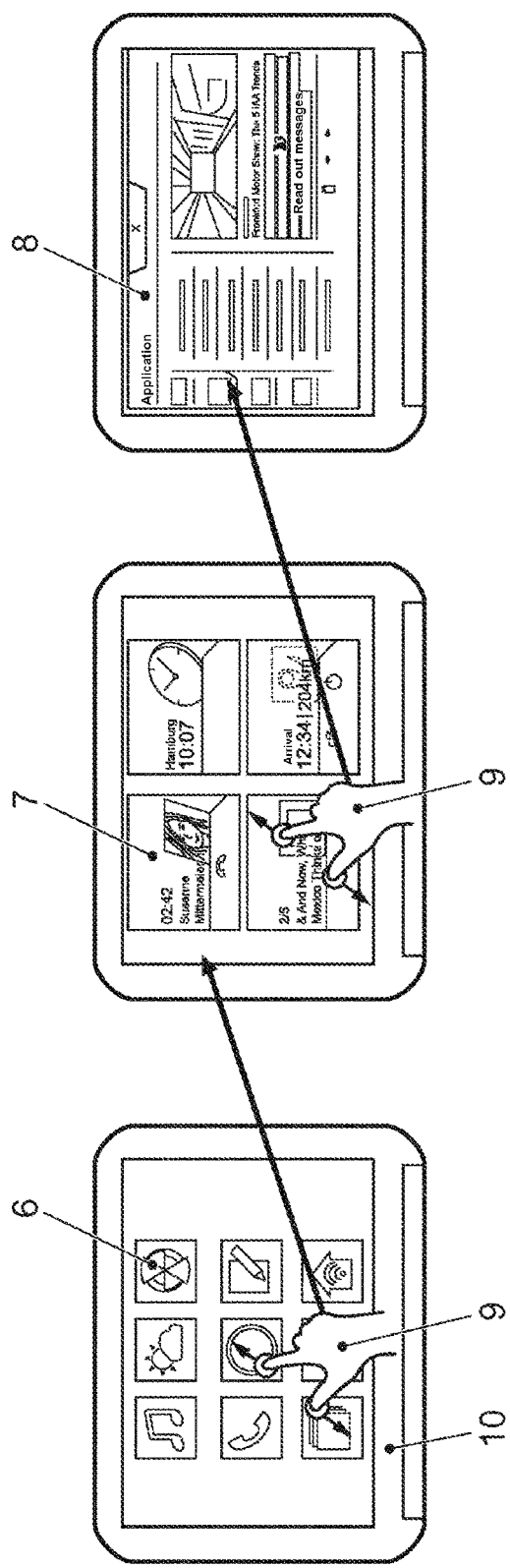
FIGS. 2a-c show a schematic drawing of the transition between three exemplary presentation levels with varying degrees of detail.

FIG. 2 shows schematically, for an application of the disclosed embodiments in a transportation vehicle, a display on a screen 10 in three display levels with varying degrees of detail as well as the transition between these display levels. For example, the screen 10 can be positioned in the central console and is designed as a touch screen display, so that any touch on the display surface with a finger or multiple fingers of the hand 9 of the user allows an operation or control of the applications. Partial FIG. 2a shows an overview of the existing applications, including, where appropriate, other available ones, symbolized by the icons 6. As an example, here nine icons for nine different applications are shown.

The icons 6 or applications symbolized by them relate to various functions or subject areas. Thus the applications can be used, for example, for audio playback, weather forecasting, telephony, air conditioning or navigation purposes or to reproduce transportation vehicle-related information. The display of the icons 6 in the overview display can be configured permanently, but particularly when there are a large number of applications, the user can select icons for the applications most important to them and, if appropriate, position them anywhere on the screen 10.

If the user then touches the touch-sensitive surface of the touch screen with two fingers, optionally with the thumb and index finger, of their hand 9 and moves the two fingers apart (so-called unpinch gesture), then for the applications symbolized by the icons 6 in the region of the fingers a display of enlarged symbols 7 is shown, as described in partial FIG. 2b. As an example, here four larger icons or tiles filling the screen are shown for four applications. The presentations now have an increased level of detail, so that, for example, for a telephony application the current call duration and the name of the other conversation partner is indicated together with a picture of the conversation partner. In addition, a control element for ending the call is displayed, which can be operated directly by the user in this form.

By moving the two fingers apart once more in the region of one of the enlarged icons, the full information content 8 for the associated application is then displayed, as shown in partial FIG. 2c. The operation is now no longer limited to a few main functions but covers the full range of functions.

To be able to revoke the enlarged display and to move through the presentations with different degrees of detail in the opposite direction, the opposite gesture may be executed by the user and detected, in other words the user moves the fingers together again (so-called pinch gesture).

For a larger number of applications, not all of the icons of the available applications can be displayed in the intermediate stages. In this case, a shift in the display can be performed by the user. Thus, using a swiping motion with one or more fingers the displayed icons can be moved in a horizontal, vertical or even in other directions of motion.

Figure 3B:
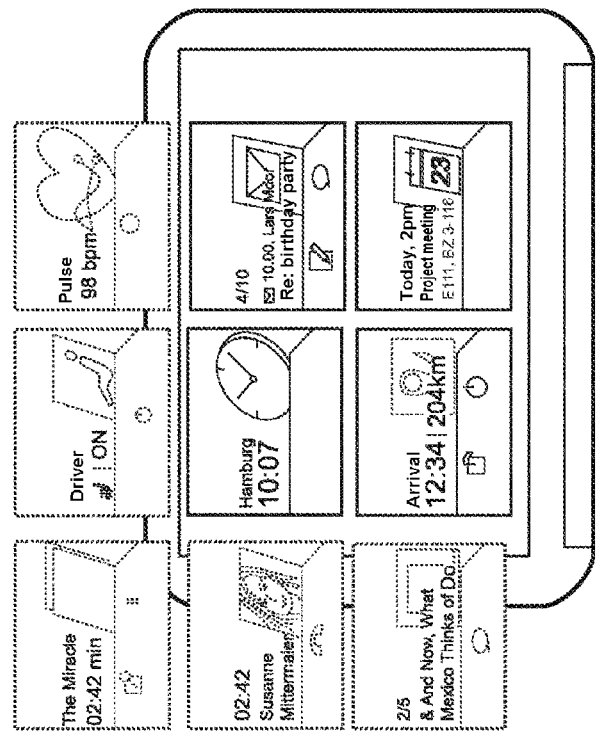
FIGS. 3a-b show a schematic drawing of the different presentation of a plurality of icons on a screen before and after the icons are moved.
Figure 3A:
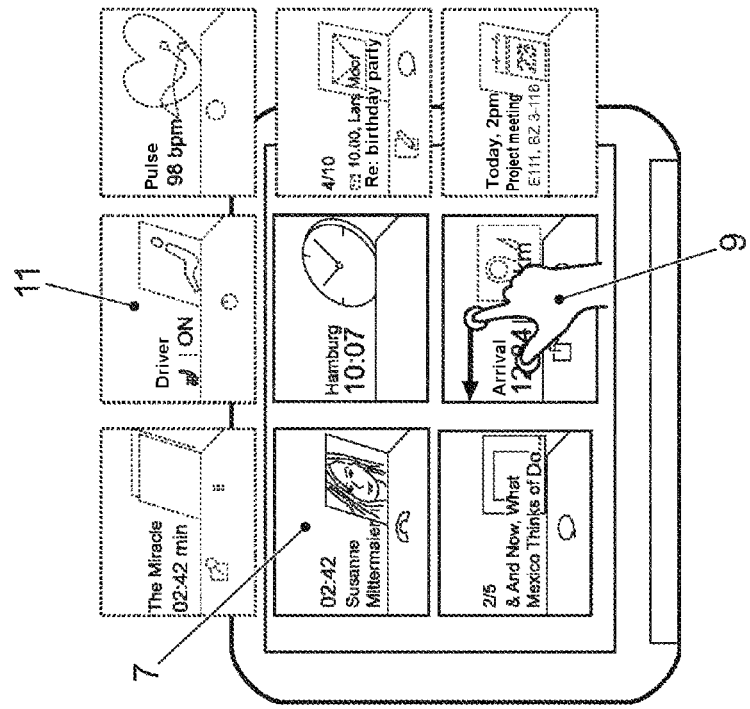

An example of this is shown in FIG. 3 for nine larger icons, associated with nine different applications. The rectangular icons in this case are arranged in a 3×3 grid. Due to the enlarged display of the icons only four of them can be displayed on the screen, other icons or tiles 11 are outside of the display area of the screen and are therefore not visible. In partial FIG. 2a the icons arranged on the left and in the center of the middle and lower row are displayed firstly and possibly operated by the user. To display the icons in the middle and lower row on the right of these and be able to operate them, the user performs a swiping motion to the left with their index finger. After this swiping motion has been detected and evaluated, the display is adapted so that the desired icons are then displayed.

Due to the limited size of the screen and to make the display more appealing, snap-in positions are used for the icons so as not to display any incomplete representation of the icons. The displacement of the icons is therefore not directly proportional to the swipe movement but instead takes place in discrete operations, i.e., if the distance traveled by the finger on the surface of the screen has reached a certain length, all icons in a grid, which is not reproduced on the screen, are displayed displaced by one position in the direction of the swipe movement.

To initiate the displacement of the icons using a swiping motion is beneficial when the change in the degree of detail is also controlled by a finger gesture, since a uniform and easily understandable operating concept is provided for the user.

Instead of performing the user inputs via a touch screen, these can also be acquired in other ways. For example, appropriate gestures can be performed by the user in the space in front of the screen and acquired by a suitable gesture sensor. The gesture sensor can detect the position of the user's hand or fingers, for example, by a camera, wherein illumination with infra-red light can be provided.

The disclosed embodiments can be used in the area of automotive engineering, but is by no means limited thereto. Rather, the disclosed embodiments can be used in any computer-based systems that have a graphical user interface with a menu structure for multiple applications.

LIST OF REFERENCE NUMERALS

1 method operation with presentation of icons for a plurality of available applications without operating capability
2 method operation with acquisition of a user input for selection of part of the applications
3 method operation with display of enlarged icons for selected applications with limited operating capability
4 method operation with acquisition of a user input for selecting a single application
5 method operation with presentation of the content of a selected application with comprehensive operating capability
6 icon
7 tile
8 full screen display for an application
9 hand of the user
10 screen
11 tile not shown on the screen

The invention claimed is:

1. A method for adapting presentation and use of a graphical user interface, the method comprising:
displaying, on a home screen of the graphical user interface, a plurality of icons corresponding to a plurality of applications, wherein each icon functions as an identifier for the corresponding application, wherein the displayed icon can be interacted with by a user, prior to activating the application associated therewith, to trigger presentation of an enlarged icon associated with the displayed icon and the corresponding application, wherein activating the application triggers a comprehensive functionality of the application, and wherein the enlarged icon includes information generated by and associated with the corresponding application;
in response to detecting a first input by the user on the home screen of the graphical user interface selecting at least one of the displayed icons, presenting the enlarged icon associated with the corresponding application, wherein limited functionality of the corresponding application is available in response to a user action performed in relation to at least one application; and
in response to detecting an additional input by the user on the home screen of the graphical user interface selecting the enlarged icon, activating the corresponding application and presenting content of the corresponding application, wherein the comprehensive functionality of the corresponding application can be accessed by the user using the graphical user interface.

2. The method of claim 1, wherein a first control type associated with the first input and a second control type associated with the additional input are same.

3. The method of claim 2, wherein the first input includes a control gesture by the user.

4. The method of claim 3, wherein a cancellation of the selection is triggered by an opposite control gesture.

5. The method of claim 3, wherein the presentation and operation of the graphical user interface are carried out by a touch-sensitive display surface of a display.

6. The method of claim 5, wherein the moving apart of two fingers of the user on the touch-sensitive display surface is acquired as a control gesture for the selection.

7. The method of claim 5, wherein the moving together of two fingers of the user on the touch-sensitive display surface is acquired as a control gesture for canceling the selection.

8. The method of claim 1, wherein when displaying the icons and/or enlarged icons of only some of the applications the presentation can be shifted by a user input, such that icons and/or enlarged icons from another part of the applications are presented.

9. The method of claim 8, wherein snap-in positions are provided for the presentation of the icons and/or enlarged icons, so that the icons and/or enlarged icons are aligned and presented in full at these snap-in positions in response to displacement of the icons and/or enlarged icons.

10. A graphical user interface configured to carry out a method for adapting presentation and use of the graphical user interface, the method comprising:
- displaying, on a home screen of the graphical user interface, a plurality of icons, wherein each icon functions as an identifier for a corresponding application, wherein the displayed icons can be interacted with by a user, prior to activating the application associated therewith, to trigger presentation of an enlarged icon associated with the displayed icon and the corresponding application, wherein activating the application triggers a comprehensive functionality of the application, and wherein the enlarged icon includes information generated by and associated with the corresponding application;
- in response to detecting a first user input on the home screen of the graphical user interface selecting at least one of the icons, presenting the enlarged icon associated with the corresponding application, wherein limited functionality of the corresponding application is available in response to a user action performed in relation to at least one application; and
- in response to detecting an additional input by the user on the home screen of the graphical user interface selecting the enlarged icon, activating the corresponding application and presenting content of the corresponding application, wherein the comprehensive functionality of the corresponding application can be accessed by the user using the graphical user interface.

11. A transportation vehicle comprising:
- a graphical user interface configured to carry out a method including:
- displaying, on a home screen of the graphical user interface, a plurality of icons corresponding to a plurality of applications, wherein each icon functions as an identifier for the corresponding application, wherein the displayed icon can be interacted with by a user, prior to activating the application associated therewith, to trigger presentation of an enlarged icon associated with the displayed icon and the corresponding application, wherein activating the application triggers a comprehensive functionality of the application, and wherein the enlarged icon includes information generated by and associated with the corresponding application;
- in response to detecting a first input by the user on the home screen of the graphical user interface selecting at least one of the displayed icons, presenting the enlarged icon associated with the corresponding application, wherein limited functionality of the corresponding application is available in response to a user action performed in relation to at least one application; and
- in response to detecting an additional input by the user on the home screen of the graphical user interface selecting the enlarged icon, activating the corresponding application and presenting content of the corresponding application, wherein the comprehensive functionality of the corresponding application can be accessed by the user using the graphical user interface.

12. The graphical user interface of claim 10, wherein a first control type associated with the first input and a second control type associated with the additional input are same.

13. The graphical user interface of claim 12, wherein the first input includes a control gesture by the user.

14. The graphical user interface of claim 13, wherein a cancellation of the selection is triggered by an opposite control gesture.

15. The graphical user interface of claim 13, wherein the presentation and operation of the graphical user interface are carried out by a touch-sensitive display surface of a display.

16. The graphical user interface of claim 15, wherein the moving apart of two fingers of the user on the touch-sensitive display surface is acquired as a control gesture for the selection.

17. The graphical user interface of claim 15, wherein the moving together of two fingers of the user on the touch-sensitive display surface is acquired as a control gesture for canceling the selection.

18. The graphical user interface of claim 10, wherein when displaying the icons and/or enlarged icons of only some of the applications the presentation can be shifted by a user input, such that icons and/or enlarged icons from another part of the applications are presented.

19. The graphical user interface of claim 18, wherein snap-in positions are provided for the presentation of the icons and/or enlarged icons, so that the icons and/or enlarged icons are aligned and presented in full at these snap-in positions in response to displacement of the icons and/or enlarged icons.

* * * * *